No. 629,057.  
W. C. WESLEY & W. CLARK.  
THILL COUPLING.  
(Application filed Apr. 19, 1899.)
Patented July 18, 1899.
(No Model.)
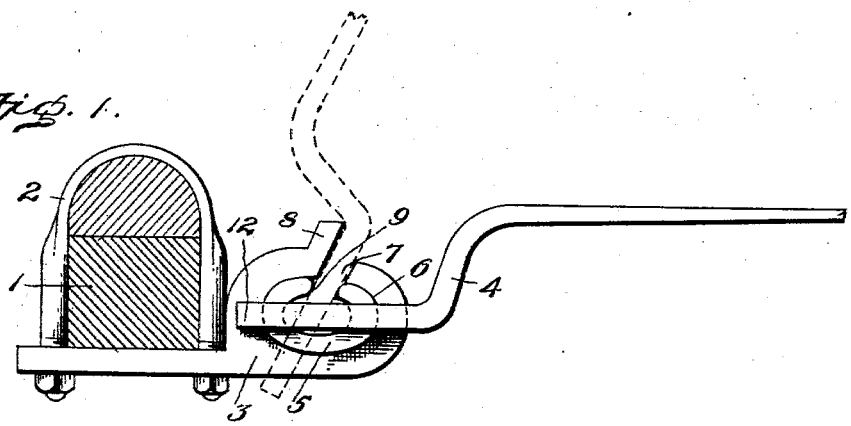
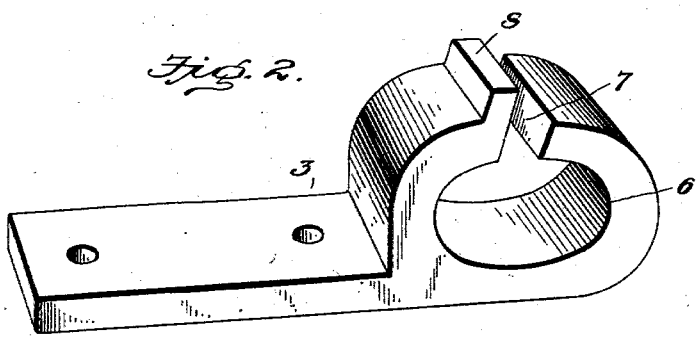
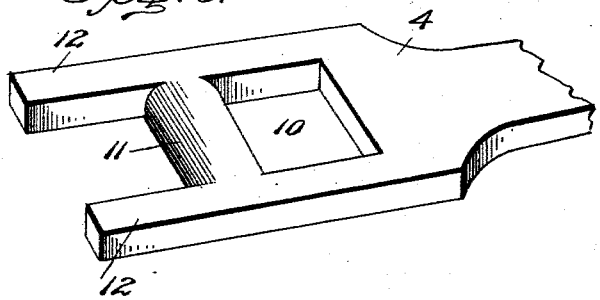
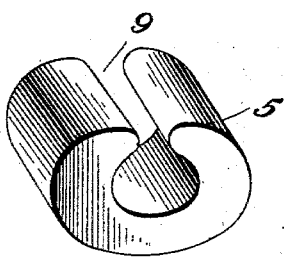
Witnesses  
Inventors  
W. C. Wesley  
Wm. Clark  
by H. B. Willson & Co.  
Attorneys

UNITED STATES PATENT OFFICE.

WILLIS C. WESLEY AND WILLIAM CLARK, OF WEST SUPERIOR, WISCONSIN.

THILL-COUPLING.

SPECIFICATION forming part of Letters Patent No. 629,057, dated July 18, 1899.

Application filed April 19, 1899. Serial No. 713,573. (No model.)

*To all whom it may concern:*

Be it known that we, WILLIS C. WESLEY and WILLIAM CLARK, citizens of the United States, residing at West Superior, in the county of Douglas and State of Wisconsin, have invented certain new and useful Improvements in Thill-Couplings; and we do declare the following to be a full, clear, and exact description of the invention, such as will enable others skilled in the art to which it appertains to make and use the same.

The invention has relation to thill-couplings of the "antirattler" type; and the object is to provide a device of this character which shall be simple in construction, durable in use, comparatively inexpensive of production, and one in which the thills may be easily and quickly attached to and removed therefrom.

With this object in view the invention consists in certain features of construction and combination of parts, which will be hereinafter more particularly described and claimed.

In the accompanying drawings, Figure 1 is a side elevation of our improved thill-coupling, showing in full lines the position the parts assume when in operation and dotted lines the position they assume when it is desired to disconnect the thills from the vehicle. Fig. 2 is an enlarged detail perspective view of the coupling-head. Fig. 3 is a similar view of the thill-iron, and Fig. 4 is a similar view of the elastic noiseless cushion.

In the drawings, 1 denotes the axle; 2, the axle-clip; 3, the coupling; 4, the thill-iron, and 5 the elastic cushion.

The coupling-head is secured to the axle 1 by the clip 2 and is provided with a transverse oval aperture 6, intersected by a vertical transverse slot 7, one wall of which is extended upwardly to form a stop-shoulder 8, for a purpose hereinafter to appear.

The elastic cushion, which is preferably made of rubber, has its external outline corresponding in shape to the oval aperture 6, within which it is seated, and is provided with the slot 9, registering with the slot 7 of the coupling-head.

The thill-iron has near its rear end a rectangular aperture 10, a cross-bar 11, and laterally-projecting arms or extensions 12.

In assembling the parts the elastic cushion 5 is inserted sidewise into the aperture 6, with its slot 9 registering with the slot 7 in the coupling-head. The thill-iron is now engaged with the coupling-head, with the arms 12 of the thill-iron straddling the head or paralleling the sides thereof. The thill-iron is now elevated until the cross-bar 11 contacts with the stop 8, which guides the bar 11 through the slot 7 of the head and into the slot of the elastic cushion. The thill-iron is now lowered in the position shown in full lines in Fig. 1.

From the foregoing description, taken in connection with the accompanying drawings, the construction and operation of the invention will be readily understood without requiring an extended explanation. It will be seen that no parts of the metal contact, but are all spaced apart by the elastic cushion, the ends of which project laterally beyond the sides of the head and engage the slot-walls of the aperture and the inner faces of the arms. It will be further seen that the arms serve to prevent the cushion from working out of position or becoming twisted or distorted, thus materially increasing the life of the cushion, as well as preventing its accidental displacement.

Having thus fully described our invention, what we claim, and desire to secure by Letters Patent, is—

A thill-coupling, comprising a head formed with a transverse elongated aperture 6 intersected by the transverse slot 7, the rear wall of which projects upwardly to form a stop-shoulder 8, an elastic cushion corresponding in outline to the aforesaid aperture, and provided with the transverse slot registering with the slot of the head, and the thill-iron having a rectangular aperture 10 and cross-bar 11 at the end of the aperture, and parallel rearwardly-extending arms 12, substantially as set forth.

In testimony whereof we have hereunto set our hands in presence of two subscribing witnesses.

W. C. WESLEY.
WM. CLARK.

Witnesses:
L. J. MOSS,
ARTHUR McGUIRE.